(12) United States Patent
de Guzman et al.

(10) Patent No.: US 7,303,010 B2
(45) Date of Patent: Dec. 4, 2007

(54) APPARATUS AND METHOD FOR AN AUTONOMOUS ROBOTIC SYSTEM FOR PERFORMING ACTIVITIES IN A WELL

(75) Inventors: Neil de Guzman, Houston, TX (US); Lawrence Lafferty, Alpharetta, GA (US); Chad Lafferty, Alpharetta, GA (US); Donald K. Steinman, Missouri City, TX (US)

(73) Assignee: Intelligent Robotic Corporation, Houston, TX (US)

( * ) Notice: Subject to any disclaimer, the term of this patent is extended or adjusted under 35 U.S.C. 154(b) by 917 days.

(21) Appl. No.: 10/268,444

(22) Filed: Oct. 11, 2002

(65) Prior Publication Data
US 2005/0288819 A1    Dec. 29, 2005

(51) Int. Cl.
*E21B 47/09* (2006.01)

(52) U.S. Cl. ............... 166/255.1; 166/250.01; 700/245

(58) Field of Classification Search .......... 700/245, 700/262; 175/24, 26, 27, 38, 40, 45, 48; 166/250.01, 255.1, 255.2
See application file for complete search history.

(56) References Cited

U.S. PATENT DOCUMENTS

| 4,648,454 A * | 3/1987 | Yarnell | 166/297 |
| 6,026,911 A * | 2/2000 | Angle et al. | 175/24 |
| 6,446,718 B1 * | 9/2002 | Barrett et al. | 166/250.01 |
| 2003/0234110 A1 * | 12/2003 | McGregor | 166/373 |
| 2004/0055746 A1 * | 3/2004 | Ross et al. | 166/250.15 |
| 2005/0072577 A1 * | 4/2005 | Freeman | 166/386 |

* cited by examiner

*Primary Examiner*—David Bagnell
*Assistant Examiner*—Daniel P. Stephenson
(74) *Attorney, Agent, or Firm*—Tim Headley; Wright, Brown & Close, L.L.P.

(57) ABSTRACT

An autonomous robot performs maintenance and repair activities in oil and gas wells, and in pipelines. The robot uses the well and pipeline fluids to provide most of the energy required for the its mobility, and to charge a turbine from which it may recharge batteries or power a motor for additional propulsion. A control system of associated systems controls the robot, enabling the robot to share plans and goals, situations, and solution processes with wells, pipelines, and external control systems. The control system includes decision aids in a series of knowledge bases that contain the expertise in appropriate fields to provide intelligent behavior to the control system. The intelligent behavior of the control system enables real time maintenance management of wells and pipelines, through actively collecting information, goal-driven system, reasoning at multiple levels, context sensitive communication, activity performing, and estimation of the operators' intent.

3 Claims, 14 Drawing Sheets

ROBOT PUSHES THE
CYLINDER WITH THE HELP OF
BRAKES AND PISTONS TO
OPEN THE SAFETY VALVE

ROBOT PULLS THE
CYLINDER WITH HELP OF
BRAKES AND PISTONS TO
CLOSE THE SAFETY VALVE

APPARATUS AND METHOD FOR AN AUTONOMOUS ROBOTIC SYSTEM FOR PERFORMING ACTIVITIES IN A WELL

CROSS-REFERENCES TO RELATED APPLICATIONS

This application claims the benefit of U.S. Provisional Application No. 60/325,963, Oct. 1, 2001.

STATEMENT REGARDING FEDERALLY SPONSORED RESEARCH OR DEVELOPMENT

None.

REFERENCE TO A "SEQUENTIAL LISTING"

None.

BACKGROUND OF THE INVENTION

1. Field of the Invention

The invention relates to robotic autonomous equipment to perform maintenance work in wells (conduits) using the flow of preferably oil and gas through the conduit to aid in the movement and a control system that allows communication and coordination with an entire system of associated devices.

2. Description of the Related Art

The production of oil and gas from the reservoirs within earth requires the building of conduits for the transport of the oil and gas. These conduits are wells, pipelines, and risers and they convey the oil and gas to a desired location for distribution or processing. The hydrocarbon production system requires maintenance of the conduits and management of permanently emplaced tool to improve the production of hydrocarbons from the reservoir.

The production of hydrocarbons takes place over many years and the conduits (wells, pipelines, and risers) through which the oil and gas are conveyed deteriorate and the permanently emplaced equipment deteriorates during the operating life of the conduits. These systems are operated until they break at which time individual components, or the entire system, is replaced. Various operations are performed during the producing life of the wells, pipelines, or risers. Such operations generally require ceasing production of hydrocarbons through the conduits before any work can take place. The operations that are performed during the producing life of the wellbore include removing and replacing different types of devices, including flow control devices, sensors, packs, and seals. Remedial work takes place by shutting down production to move sliding sleeves, replace gas lift valves, testing zones, acquiring data by introducing sensors, repairs and replacement of production tubes and other components.

Once the production of hydrocarbons has ceased, downhole operations are performed by conveying a bottomhole assembly containing the tools required to perform the work. A rig is positioned at the wellhead to convey the bottomhole assembly to the desired work site using a conveying means attached to the rig which is typically a coiled tubing, jointed pipe, electric line, wire line, wire line and tractor device. Operation may include downhole tools using artificially based controls that are conveyed into the wellbore by a base unit from which the work unit detaches itself to perform a predetermined operation and then returns to the base unit to transfer data and recharged itself.

Certain wells are built to enable surface activated control of fluid control devices located in the wellbore and include permanent emplacement of hydraulic cables and wires by which to activate from the surface sleeves, chokes, packers or seals needed to open or close off production from different zones. Permanently emplace fiber optic cables may be used to continuously provide data to the surface control system on temperature and pressure from locations throughout the well.

U.S. Pat. No. 5,186,264 to du Chaffaut U.S. Pat. No. 5,316,094 to Pringle (Pringle '094) U.S. Pat. No. 5,373,898 to Pringle (Pringle '898) ad U.S. Pat. No. 5,394,951 to Pringle et al discloses certain structures for guiding downhole tools in wellbores. The du Chaffant patent discloses a device for guiding a drilling tool into the wellbore. The Pringle '094 patent discloses an orientation mandrel that is rotatable in an orientation body for providing rotational direction. Pringle '898 patent discloses a tool with an elongated circular body and fluid bore throughout.

Pringle et al patent discloses a bottomhole drilling assembly connectable to coiled tubing that is controlled from the surface.

Another series of patents disclose apparatus for moving through the interior of a pipe. These include U.S. patents to Hedgcoxe et al., U.S. Pat. No. 5,203,646 to Landsberger et al. and U.S. Pat. No. 5,392,715 to Pelrine. The Hedgcox et al. Patent discloses a robotic pipe crawling device with two three wheeled modules pivotally connected at their centers. Each module has only one idler wheel and two driven wheels, an idler yoke and a driveline yoke chassis with parallel, laterally placed, rectangular side plates. The idler side plates are pinned to the chassis and the drive wheels are rotably mounted one at each end a motor at each end of the chassis pivots the wheel independently into and out of a wheel engaging position n the interior of the pipe and a and a drive motor carried by the driveline yoke drives drive wheels in opposite directions to propel the device. A motor mounted within each idler yoke allows them to pivot independently of the driveline yoke. A swivel joint in the chassis midsection allows each end to rotate relative to each other. The chassis may be extended with additional driveline yokes. In addition to a straight traverse the device is capable of executing a "roll sequence" to change its orientation about its longitudinal axis, and "L", "T", and "Y" cornering sequences. Connected to a computer the device can "learn" a series of axis control sequences after being driven through the maneuvers manually.

The Landsberger et al Patent discloses an underwater robot that is employed to clean and/or inspect the inner surface of high flow rate pipes. The robot crawls along a cable positioned within the pipe to be inspected or cleaned. A plurality of guidance fins relies upon the flow of water through the pipe to position the robot as desired. Retractable legs can fix the robot at a location within the pipe for cleaning purposes. A water driven turbine can generate electricity for various motors, servos and other actuators contained on board the robot. The robot also can include wheel or pulley arrangements that further assist the robot in negotiating sharp corners or other obstructions.

The Pelrine Patent discloses an in pipe running robot with a vehicle body movable inside the pipe along a pipe axis. A pair of running devices is disposed in the front and rear positions of the vehicle body. Each running device has a pair of wheels secured to the opposite ends of an axe!. The wheel are steerable as a unit about the vertical axis of the vehicle body and have a center of steering thereof extending linearly in the fore and aft direction of the vehicle body. When the robot is caused to run in a circumferential direction inside in a pipe the vehicle body is set in a posture having the fore and aft direction inclined with respect to the pipe axis. The running devices are then set to posture for running in the circumferential direction. Thus, the running devices are driven to cause the vehicle body to run stably in the circumferential direction of the pipe.

Additionally, U.S. Pat. No. 5,291,112 to Karidis et al and U.S. Pat. No. 5,350,033 to Kraft disclose robotic devices with certain work elements. The Karidis et al. patent disclose robotic devices with certain work elements. The Karidis et a!. patent discloses a positioning apparatus and movement sensor in which positioned includes a first sensor having a curved corner reflector, a second section and a third section with an analog positioning sensitive photodiode. The second section includes light emitting diodes (LEDs) and photo detectors. Two LEDs and the photo detectors faced in the first direction toward the corner reflector. The third LED faces in a second direction different from the first direction toward the photosensitive photodiode. The second section can be mounted on an arm of the positioned and used in conjunction with the first and third sections to determine movement or position of that arm.

The Angle et al U.S. Pat. No. 5,947,213 and No. 6,026,911 and No. 6,112,809 disclose downhole tools using artificial intelligence based control concepts in which a problem is decomposed into a number of tasks achieving behaviors running in parallel. The system includes an electrically operated mobility platform to move the downhole tool and end work device to perform the desired work. The downhole tool contains an imaging device to provide pictures of the downhole environment. The data from the downhole tools is communicated to a surface computer, which controls the operation of the tool and displays pictures of the tool environment. Tactile sensors are used as imaging devices.

The downhole tool may be composed of a base unit and detachable work unit, which detaches and returns to the base unit to be recharged. A two-way telemetry system provides two-way communication between the downhole tool and the surface control unit via a wire line.

The Barrett et al U.S. Pat. No. 6,405,798 discloses downhole tools and apparatus for logging and/or remedial operations in a Wellbore in a hydrocarbon reservoir. The tool comprises an autonomous unit for measuring downhole conditions, preferably flow conditions. The autonomous unit comprises a means of locomotion, measurement, and a logic unit capable of making decisions based on at least two parameters. It can be separately attached to a wireline unit and connected to the surface or launched from the surface and preferably includes an active component for closing and/or breaking the connection.

The above noted patents and known prior art downhole tools (a) are dependent upon wireline hydraulic lines, electric lines, and fiber optic cable for two way communication between the downhole and the surface control unit (b) require communication of data from the downhole tool to a surface control to a surface computer, which controls the operation of the stationary or movable tool (c) do not have a program in the device which can control the work tool in the performance of the specific functions to perform specific types of work (c) only operate in the well, or conduit when production of hydrocarbons has been shut down and cannot perform maintenance functions without shutting down production. (d) are dependent upon mobility systems that are dependent upon lines connected to the surface to provide power and control, that use batteries that require recharging by surface systems or conveying units, or batteries of limited duration (e) are dependent upon the use of behavior based artificial intelligence software systems. Prior art tools require rigs for mobility and power or surface control systems to actuate permanently wired downhole systems which are very expensive or that are based upon using artificially based control systems with tools that require wireline connected surface control units that are subject to breaking or require shutting down production with the accompanying loss of income.

The present invention addresses some of the above noted needs and problems with prior art downhole tools and provides a robotic device that (a) does not require any connections to the surface by wire, umbilical, or other means for its operation (b) has a control system that allows the coordination and cooperation with other associated autonomous systems (c) has specific software programs written before entering the well in common languages such as C++ designed to control all specific functions required for work, (d) has the ability to perform maintenance functions in the conduit while hydrocarbons are flowing by past it and while the force of the flow of the fluids to generate power for operations using turbines or parachutes and bellows for mobility upward and braking in a downward direction, can identify conditions in the well that require action to be taken for optimizing flow and can take appropriate action and then report the action taken the next trip to the surface.

Our invention is a Robot Locomotion Using Inch Worm And Iris Drives to achieve energy efficiency enabling the robot to perform for longer periods of time in the well bore.

It has been recognized that it is desirable to reduce the cost of servicing oil and gas wells in remote locations and at offshore sites. Wells at such sites are often drilled at highly deviated angles, and many are horizontal. One of the major costs in the performance of these services is the rig that must servicing transport equipment through the well. Both the rental cost of the rig and the disruption of production during servicing are expensive. The industry thus seeks a means of servicing wells that eliminates the need for a rig to be continuously attached to the well during servicing, and a means to keep some production flowing during the operations.

In U.S. Pat. No. 5,947,213 and No. 6,026,911 and No. 6,112,8098 a robotic means is disclosed for lowering an apparatus into the well and conducting servicing operations. In its current embodiment, this technique involves a tractor that employs bicycle style chains asserted against the walls of the casing or tubing with strong springs or Beilville washers. However, this technique is necessarily less than 40 percent efficient because of friction of the gears and chain links. The robot is operated from a battery supplying energy for transport, conduction of services, and to power measurement instruments aboard the robot. The robot can only move through pipes whose radius does not change more than 40%.

A technique is described that employs a robotic means of lowering servicing and measurement equipment into a well and removing that equipment from the well upon completion of services. This system has more than double the energy efficiency because it uses different means of raising and lowering itself. In fact the present invention uses a combination of three types of locomotion.

First is an "inch-worm" technique wherein a clamp is asserted against the casing (or tubing) wall using hydraulic or other power means. An arm is then extended up (or down), and clamps at the end of the arm are engaged against the casing wall. The lower (or higher, respectively) clamp is then released and the arm is retracted to bring the unengaged clamps close to the engaged clamps. This motion is repeated resulting in progressive movement through the well bore.

The clamps at the top and bottom of the inchworm can also be configured to serve as guides and centralizing mechanisms. This will keep the tool aligned in the center of the well so that the tool does not rub on the walls. This will also aid in the other energy conserving transport modes described below.

Another means to permit low energy downward travel is to dither the force on the arms in order to permit limited and controlled slippage of the arms against the walls of the casing (or tubing) in water or oil wet wells. Acceleration sensors can be used to identify that the tool is falling in the well and to increase or decrease force against the sidewall to retard or permit more slippage. Use of the upper and lower clamps as guide and centralizing mechanisms will permit greater control of the dithering to control free-fall of the tool.

The third means can be used in wells with liquid phase materials in the well bore. It uses an iris-like device similar to the light restricting function performed in a photographic camera aperture setting device, the diameter of which can be controlled by sensors on the robot. The iris normally extends beyond the outside diameter of the tool, and its extent can be controlled by actuators disposed in the tool and operated by electric or other power sources. For downward motion, the iris is extended to reduce the annulus between the outside diameter of the iris and the inside diameter of the casing (or tubing) to the point were the fluid friction keeps the robot from accelerating its downward speed. Thus, with well-conditioned control of the iris diameter, the robot can fall downward until it reaches a horizontal part of the hole, a mechanical obstruction in the well, or until it reaches a predetermined downhole location. In this mode, energy consumption is very small compared to a tractor or even "inch-worm" design, because only the friction in the iris extension mechanism needs to be overcome.

Use of the upper and lower clamps as guides and centralizing mechanisms will permit better control of the fall (or rise—see below) of the tool by fluid flow. The centralizer can also permit sufficient control so that lift and fall can also be used in gas producing wells.

If there is upward flow of liquids in the well, the iris can be used to lift the robot out of the well after the mission is completed. Upward movement can use the same control system but with a smaller annulus between the iris outer diameter and the casing (tubing) inner diameter.

Combining the "inch-worm" drive with liquid conveyance will result in significant power savings. Downhole power, whether electric, hydraulic, or other, is ultimately supplied by batteries disposed in the tool. The largest cost on any downhole mission is the cost of the lithium batteries (which are currently the state-of-the-art in downhole batteries), hence, significant power savings translates directly to cost savings. Even if only the "inch worm" drive is used, it uses less energy than a chain drive because it has much lower friction losses such as the power going into the chain.

A final method of energy efficiency will be the use of a turbine driven electrical generator located in the tool that can be used to recharge rechargeable batteries in wells with liquid flow. If the tool is waiting in a flowing well, and it is clamped to the sidewall, a turbine and generator can recharge batteries to provide additional energy for extending or completing a down-well mission. Such a system could also be used during downward travel of the tool when an iris or dithered slippage is being employed.

The Capabilities of the Downhole Tool encompass all activities necessary for the management and maintenance of well throughout their life cycle.

A downhole tool has a capability for servicing wells that are drilled and completed at high angles and using multi-lateral branches to enhance oil and gas recovery. Such highly deviated wells are expensive to service. The robotic tool described above reduced the cost of servicing such wells because it does not require a rig stationed over the well during the servicing. In addition, in wells that are producing hydrocarbons, production can be continued (at some reduced rate) during passage of the robot through the well because the robot does not occupy the entire diameter of the well.

An important capability is to navigate along the correct branch of a multi-lateral completion. The tool design includes articulation so that part of the tool can move in a direction other than the principal path followed to get to a particular depth in the well. Then sensors in the tool are used to identify optional directions to be taken. Information preprogrammed into the computer control system of the tool use the data from the sensors to set the new direction for the tool to follow.

The tool further includes sensors to establish its current position in the well based on recognition of features of the well construction that are also described in a suitable form for the downhole computer. The computer then uses a pattern recognition routine in order to track its position based on a map of the well also loaded into the downhole computer memory.

The tool also includes mechanical actuators and other devices for performing operations on downhole hardware. Thus the tool can open and close valves, set packers, set bridge plugs, and conduct other operations needed to enhance productivity of the well.

The tool can convey sensors to assess performance of the well and to measure properties of the formation behind the casing. Such sensors may include gamma ray, neutron sensors, electrical, acoustic, and other electromagnetic sensors as may be understood by those skilled in the art of well logging.

In some embodiments, the tool can be used to convey perforating guns and to cause those guns to be discharged at controlled locations in the well. By using the depth correlation software described above, the tool can convey a perforating gun to the correct location, and it can deploy mechanical devices to constrain the gun to remain stationary until a command is provided to fire the guns. This capability allows the robot to move away from the gun during the time the gun is fired, and thereby the robot is not damaged by the percussive forces generated by the firing of the gun. After firing the gun, the robot can return to retrieve the empty gun, or it can leave the gun in place as defined by the configuration of the gun.

Another capability of the tool is that it may be configured to permit either unidirectional or bidirectional communication with the surface by means of electronic, acoustic, or mechanical pulsing. This capability will make it possible for a person to review data collected by the tool in preparation for performing a mechanical service or for perforating. Often, a review of the collar or gamma ray log is highly desirable prior to firing a perforating gun, and a bidirectional communications system will enable such a check on the tool location.

BRIEF SUMMARY OF THE INVENTION

The present invention provides a system for performing maintenance operations in the wellbore or conduit without completely shutting off the flow of hydrocarbons. Our invention is a Robot Locomotion Using Inch Worm And Iris Drives to achieve energy efficiency enabling the robot to perform for longer periods of time in the well bore.

The Capabilities of the Downhole Tool encompass all activities necessary for the management and maintenance of well throughout their life cycle.

The device is controlled by a System of Associated Systems that offers the option of automating the process of management of maintenance of wells and conduits or maintaining the human in charge of the system. This control system enables a broad and effective collaboration and cooperation of the devices located in the conduit and outside the conduit through the use of a software system that enables the device to share plans and goals, shared situation, shared solution process, and a communication mechanism that is suitable for sharing the information between conduits and external control systems. The system includes decision aids in a series of knowledge bases that contain the expertise in appropriate fields to provide intelligent behavior to the System. The intelligent behaviors of the system enable real-time maintenance management of wells and pipelines and are achieved through actively collecting information, goal-driven system, reasoning at multiple levels, context sensitive communication, activity performing, and estimation of the operators' intent.

A robotic device that can be programmed using normal language such as C++ giving it the operating programs needed to perform specified work will eliminate the need for telemetry wire line, hydraulic lines, that provide communication between the down hole devices, mobile or stationary, with surface control units; can perform various maintenance activities in the conduits without disrupting the flow of fluids; and can use the fluid flow to provide mobility and power through turbines. The robotic system is preprogrammed with an operating system written in common operating language such as C++ to control the operation of downhole tools, which become an integral part of the robot. The software programs are written to control all of the required functions for the tool to position itself at the proper location and perform the required functions. The present invention further uses the flow of fluids to provide power and mobility needed by the robotic device enabling it to be much smaller than alternative systems.

The configuration of the robot allows it to be introduced into the well through normal lubricator devices whereupon it independently travels in the well without disrupting the flow of fluids being produced and without any umbilical being connected to the surface. The robot will operate tools with a software control system written in normal programming languages such as C++ to carry out the functions need to give directions to each specific tool. The tools used will be existing tools such as are presently used to perform logging work, perforate, plug, move sleeves, and remove or replace parts or tools specifically built to carry out preventive maintenance operation that can be carried out during production such as patching areas in need of repairs, acquiring inspection related data, operating devices such as sleeves, chokes, valves, and sensors without shutting off production.

The preceding invention intends to change the method by which robots can maintain wells and pipelines by using a control system of associated autonomous systems that are preprogrammed in normal languages so that robots can function in wells by making them completely autonomous and designing them to use the flow of the fluids to provide power for movement and operation.

BRIEF DESCRIPTION OF THE SEVERAL VIEWS OF THE DRAWINGS

The summary of the invention describes the subject matter of this invention. This is further illustrated in elements, features, and advantages of the invention are described with reference made to numbered details of the drawings.

DETAILED DESCRIPTION OF THE INVENTION

Figure 1:
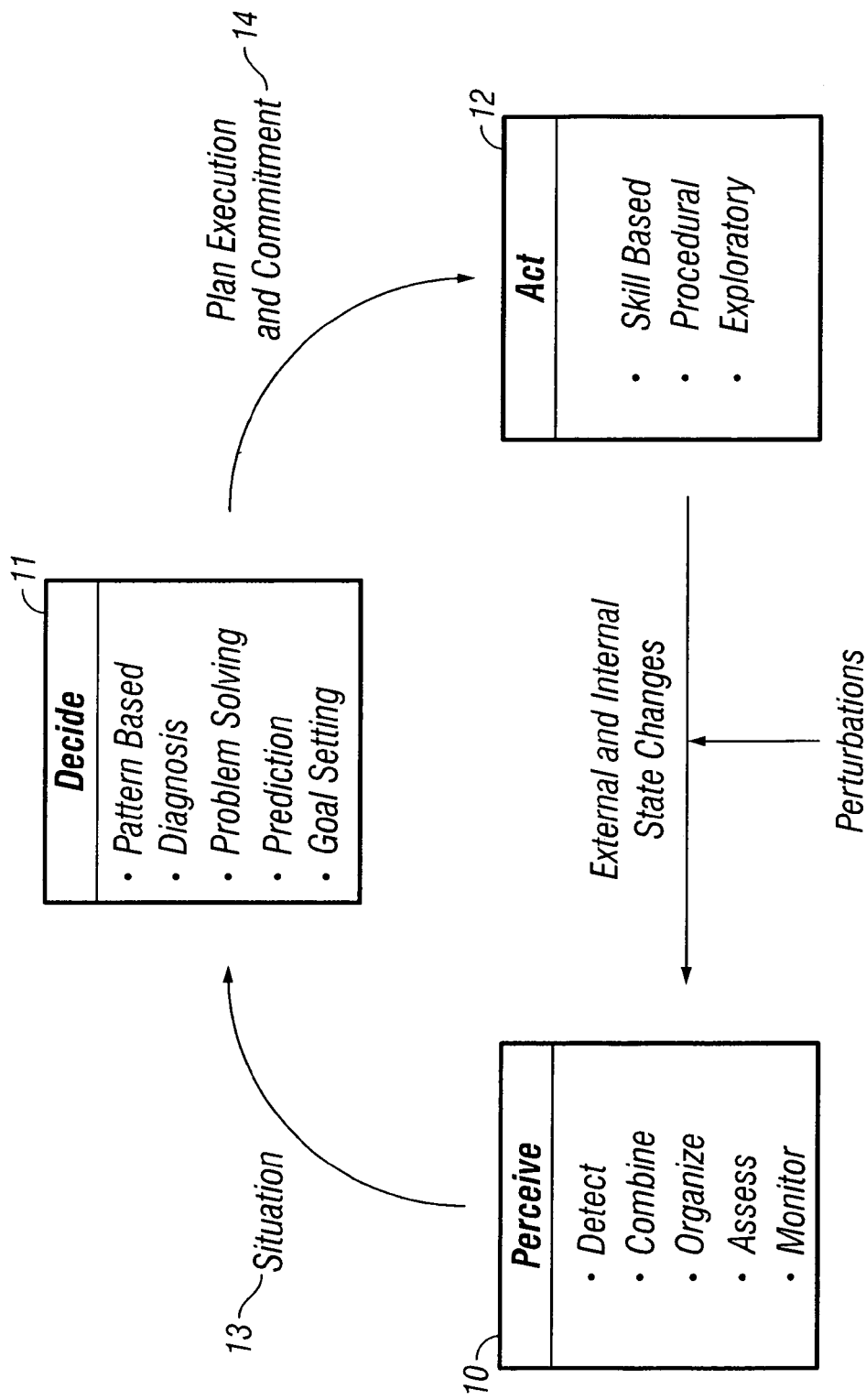
FIG. 1: Fundamental Control and Command Loop

FIG. 1: Fundamental Control and Command Loop The FIG. 1 illustrates the three basic activities of the associates, which will be located in the bottom hole assembly and at the surface of the well. These activities are Perceive 10, Decide 11, and Act 12. In perceiving the need to act, an associate can filter through vast amounts of data looking for information of importance to the user. This filtering involves the processes of detecting, combining, organizing, assessing, and monitoring the Situation 13. In helping the decision process, it can present to the user the "best" solution to this problem based on currently available information, but support the user if a different course of action is chosen. Decisions involve pattern-based recognition, diagnosing, problem solving, prediction, and goal setting and carrying out a Plan which is executed and to which the Associate commits 14. In the action part of the cycle, the associate may be authorized to perform many of the routine tasks that could distract the user from the important events that are occurring. The Act cycle 12 involves calling upon specific skills, procedures, and exploratory activities. Associate systems use symbolic processing concepts providing a solid foundation for developing computer programs that can assess, plan and act competently within well-defined operational domains. The Associate System monitors internal and external state changes 15 and adjusts to the perturbations that take place in the system. This process enables the system to respond and take action in a much faster manner than at present with a much greater degree of confidence in the efficacy of the action taken.

Figure 2:
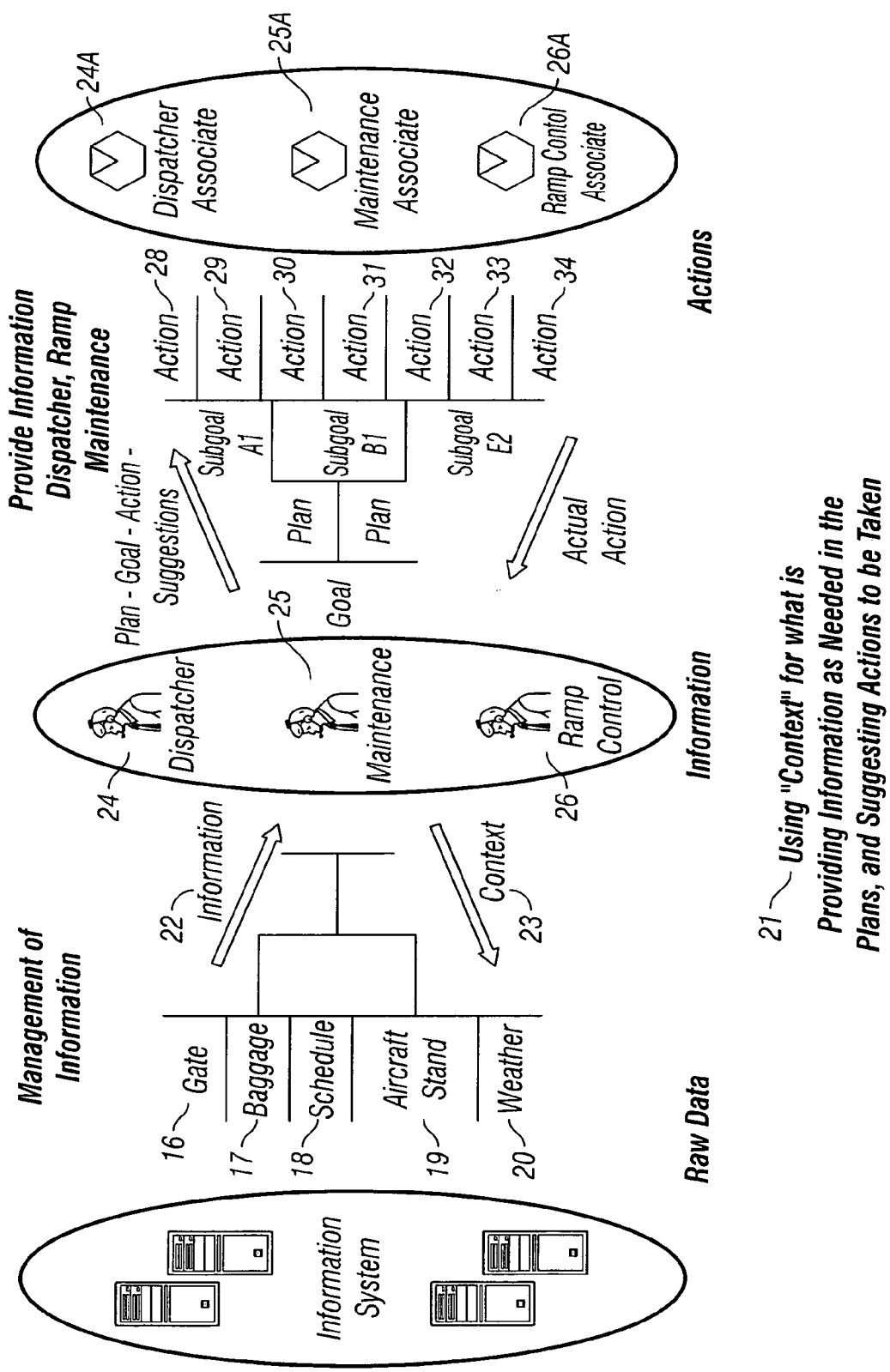
FIG. 2: Bi-Directional Data Flow

FIG. 2: Bi-Directional Data Flow provides the data flow 16, 17, 18, 19, 20 needed to support the operator's decision process. Information filtering is illustrated in FIG. 2. Demonstrating the bi-directional flow of data through a fully functional associate. The Illustration uses a scenario of logistics activity during which helicopters are dispatched to offshore platforms. Faced with a large volume of raw data from sensors and models of the logistic activity, or other reservoir activity, and "knowing" the events of interest to the operator 21, the associate can extract meaningful events from the information flow 22 cast in the proper context 23, and show them to the operator or other interested parties 24, 25, 26 who may have their own dedicated Associates 24A, 25A, 26A and provide plans which support previously established goals. While the operator is considering the events, the associate progresses to the right, recommending strategies for resolving the current problem set 27. If authorized to do so, the associate may actually perform the actions implied in those strategies 28, 29, 30, 31, 32, 33, 34. Meanwhile, should the operator choose some other means of solving the problem and begin to take those actions on his own 28, 29, 30, 31, 32, 33, 34, the associate will infer from the manager's actions the manager's intent, and begin to support that intent with other necessary actions. This emerging view of the manager's intent provides the context within which the raw data are filtered for relevance 21. The concept of a System of Associates is a form of active intelligent agent designed specifically to aid human operators in dynamic domains such as that found in management of wells and activities taking place by devices within those wells.

The System of Associates provides Decision-Aiding Technology to well and reservoir operations managers and enables the automation of certain functions. The concept of a System of Associates 24A 25A, 26A provides the tools to assist human operators 24, 25, 26, in complex tasks requiring a high cognitive workload. Associates essentially "bridge the gap" between automation systems that completely remove the human operator from the decision process and passive data access and presentation systems that merely show the user data when asked to do so. Once an unusual event is detected, humans may decide on a course of action 28, 29, 30, 31, 32, 33, 34 and implement the necessary corrective or the System may act on behalf of he human 28, 29, 30, 31, 32, 33, 34.

In the drilling function the operator can enable the bottom hole assembly to function in an autonomous manner. The bottom hole assembly will initiate action and send the information to the surface associate so that coordinated surface action can be taken. In this instance the associates 24 becomes the Bottom Hole Assembly Drilling Engineer Associate, the Bottom Hole Assembly Model Associate 25, and the Formation Evaluation Associate with corresponding Associates 24 A, 25 A, and 26 A at the surface.

Figure 3:
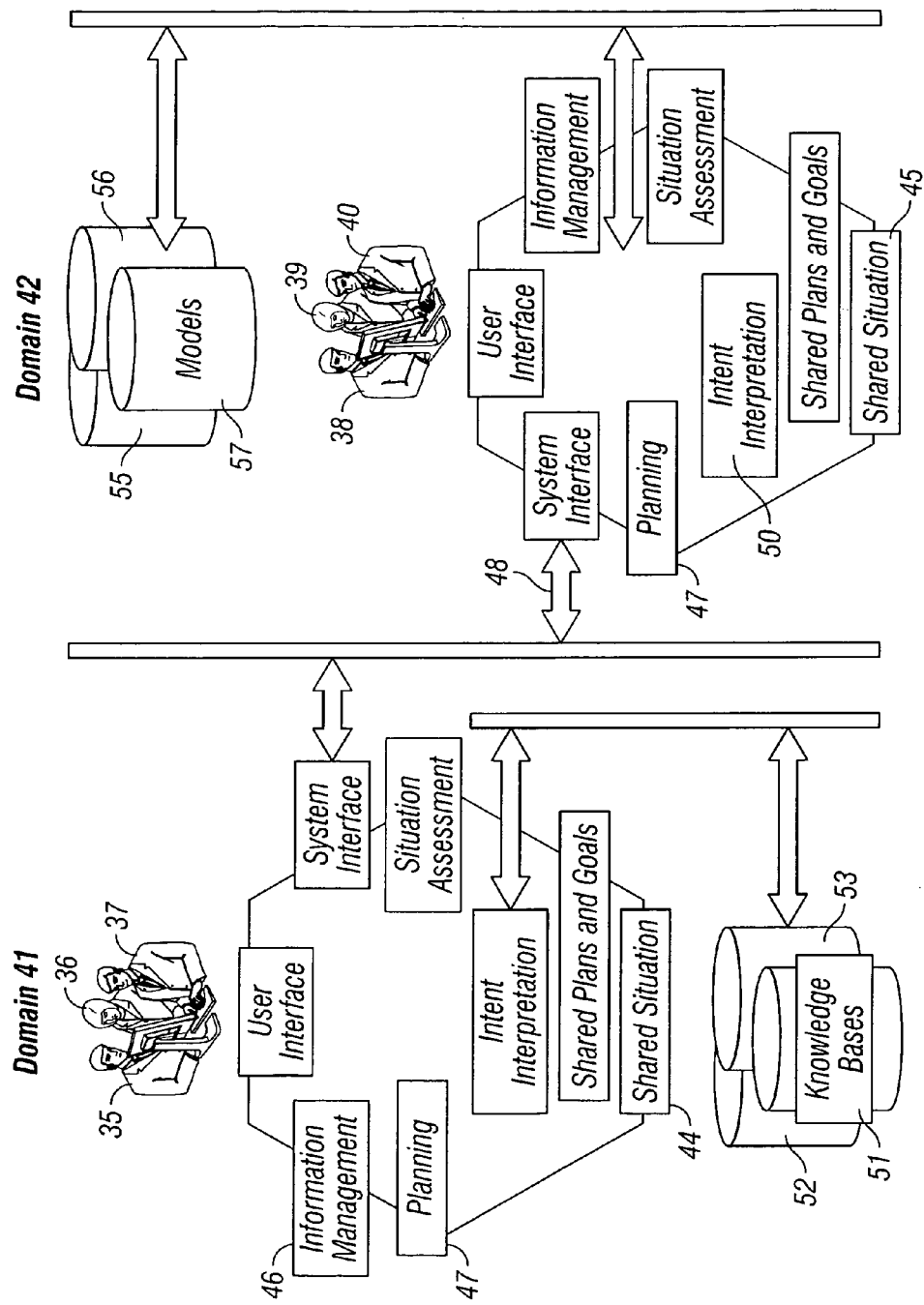
FIG. 3: Architecture for Collaboration by Individual Associates in a System of Associates.

FIG. 3: Architecture for Collaboration by Individual Associates in a System of Associates demonstrates some of the elements involved in the collaboration in the system. A System of Associates represent each person 35, 36, 37 pursuing his own viewpoint in his own Domain 41 which may be in conflict with other persons 38, 39, 40 managing operations in differing Domain 42. The Associate System provides the means to collaborate across system boundaries 43 to achieve a better outcome for the stakeholders.

This property of Associates provides the means for collaboration between the bottom hole assembly associates and the surface associates represented in the illustration as Domain 41 and Domain 42 conversely the associates will have become identified with each well and will continue to acquire more data during production from the well. The means of collaboration between the differing associates—in FIG. 2-B*ottom* Hole Assembly Drilling Engineer Associate, the Bottom Hole Assembly Model Associate 25, and the Formation Evaluation Associate with corresponding Associates—in FIG. 3—domain experts such as geophysicists 35 and 38, geologists 36 and 39, petroleum engineers 37 and 40 is provided by a System of Associates.

The types of collaboration between Associates are sufficiently varied to fulfill all system requirements.

The mixed initiative activity allows the parties 35, 36, 37, 38, 39, 40 to collaboration have a mixed initiative relationship. Any of the collaborating parties or their associates can propose information, interpretations, and solutions to the problem being addressed.

The collaborating parties have a shared sense of purpose 42, 43. There may be other goals of the parties that are not shared, or even openly contested but the parties agree on the purpose of their collaboration.

The Shared Situation 44, 45 enables the collaborating parties to interpret the conditions of the environment in the same way. If the assessment of the situation is not the same at the start of collaboration, the parties must resolve the relevant differences.

Shared planning 46, 47 is possible because the collaborating parties have a common set of expectations about the availability and applicability of methods to resolve the problem. A resolution to the problem requires consensus of the collaborating parties. Communications mechanisms 48 exist to enable the collaborating parties to exchange information about the exercise of initiative ("rules of order"), joint purpose, situation, and candidate problem resolutions.

Using this characterization of collaboration to examine the present drilling, reservoir, and well management operations, it is clear that there are many barriers to collaboration. The transformation of the present operation into a distributed collaborative system indicated by Domains 41 and 42 will by possible through the use of cooperating associate systems.

Associates may be built for each well and/or groups of wells and will be a subset of the entire well system in the reservoir.

The architecture of associate systems includes a Shared Model of Intent 49, 50 which enable Associates in a real-time basis to model of shared purpose, covering the behaviors of simulated operations of numerous Associates. The collaborative decision making is supported by knowledge bases 51, 52, 53 defined as necessary for the domain and the information is managed 54 by the system of associates. Simulation is accomplished and in different domains is supported through the use of different models 55, 56, 57, and the information is managed by the system 58.

The well associates which are represented by different Domains 41 and 42 . . . "N", N is as many as needed, can collaborate and use models to simulate of a set of complex well production scenarios using knowledge bases to aid in making decisions about where and when to produce and collaboration is achieved through the Shared Plans and Goals. The Shared Model of Intent 49 and 50 contains a plan and goal structure describing the potential behaviors of the wells and managers of reservoir operations and activities. As the activities of the active entities are interpreted in terms of their plans and goals 46 and 47, instances of the plan nodes and goal nodes from the graph are created. The plan and goal instances are used to detect conflicts in intentions and generate advisories to the conflicting parties.

Networks of associate systems include Robotic Bottom Hole Assembly and Intelligent Control of Automated Wells and Devices (ICAWD). This system simulates a networked set of well associate and devices to allow multiple wells and autonomous vehicles to be controlled by a single operator. In addition to a distributed shared model of intent for the wells and devices and the operations manager, the ICAWD system creates and maintains a distributed shared model of the situation.

The situation model is structured as a concept graph with nodes and links representing concepts and dependencies respectively. Each ICAWD entity (operations management, devices) can create instances of concepts and share them with other wells and devices.

When an ICAWD entity receives a concept from another entity, it can unify that concept with its own view of the situation. In this way, both the operations managers and the autonomous vehicles maintain a local, but shared situation.

The ICAWD system also features distributed shared planning. This function permits any of the ICAWD entities to create all or portions of tactical response plans for it and for other entities, if necessary. Operations management can create complete, detailed plan structures or pass just a high level goal to an autonomous device or well, which can complete the plan generation process.

The Associate System architectures use a dialect of C++ imposes a rigorous development discipline to ensure that the code is supportable and maintainable over the lifetime of a system installation. The use of C—H— is considered more desirable that that used by many proponents of expert systems who still program in Lisp which is and unsupportable programming or Similarly, Java (and other scripted languages) while emerging as portable, cross-platform implementation have not yet been proven for computationally intensive applications.

Figure 4:
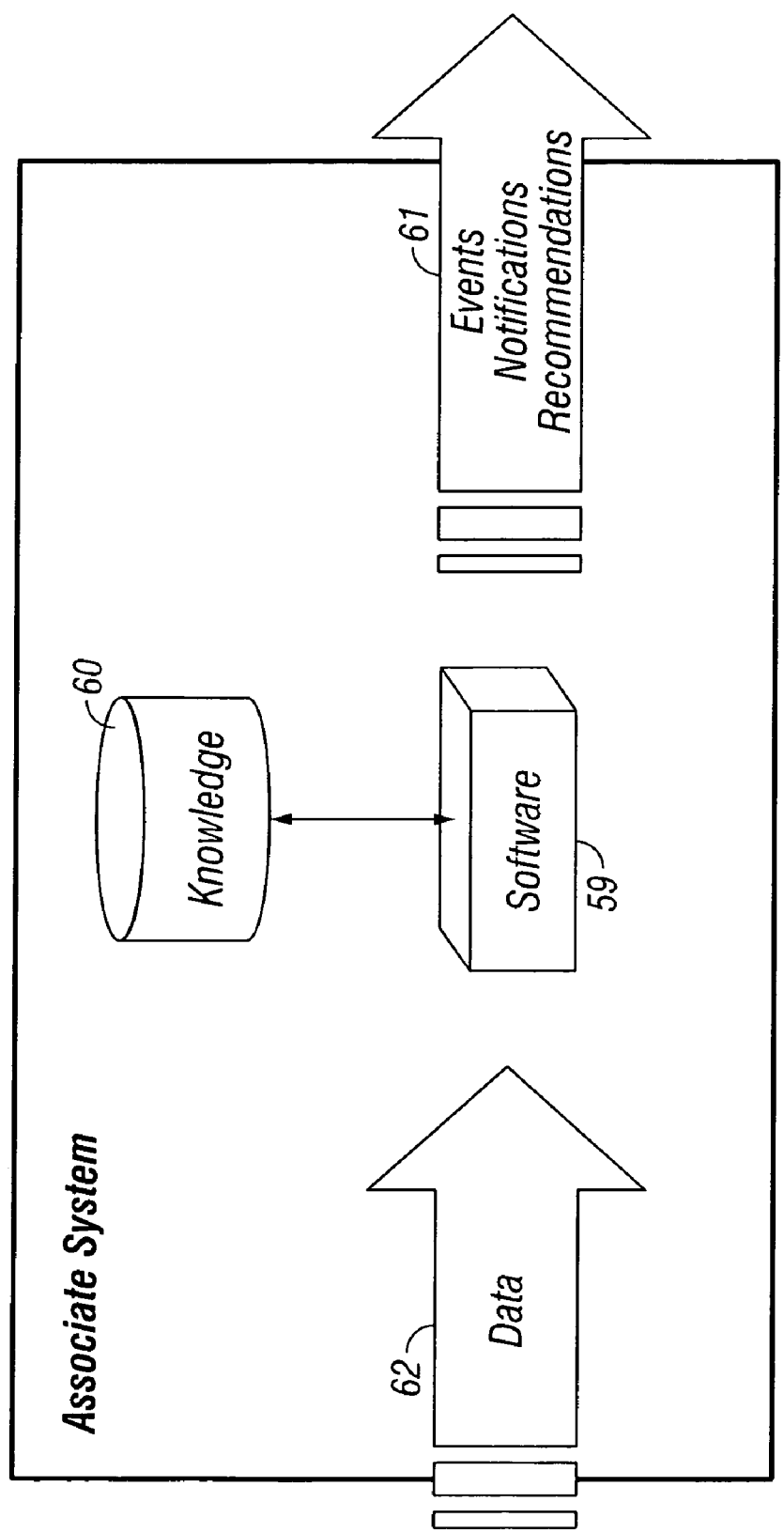
FIG. 4: Structure of an Associate System

FIG. 4: FIG. 4: Illustrates the Structure of an Associate System Structure In addition to the suite of software 59, which provides the generic behavior of an associate, a full associate system uses a set of knowledge bases 60 that are manipulated as data by the software in combination with the external data inputs 62. The knowledge bases contain descriptions of the expertise captured from subject matter experts in the appropriate fields (such as oil and gas) to provide intelligent behavior 61. The development process has been adapted and enhanced to recognize that, as much care must be taken to develop these knowledge files as in developing the underlying software structure.

Figure 5:
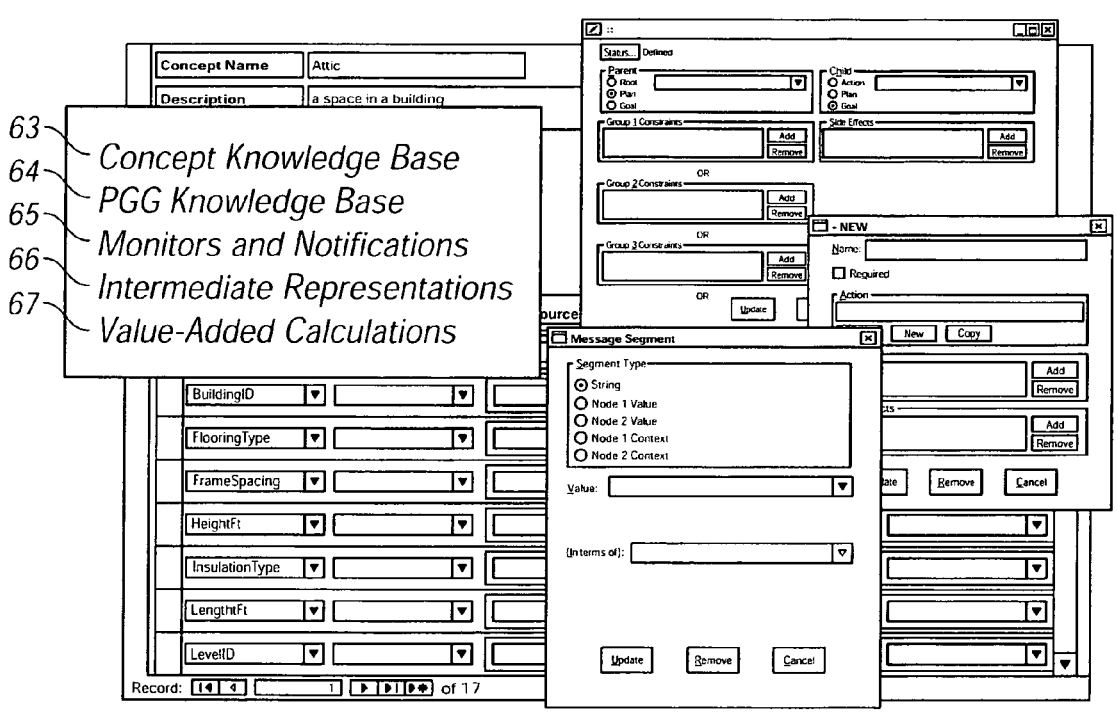
FIG. 5: Integrated knowledge Environment IKE Tool Suite

FIG. 5: Integrated Knowledge Environment—IKE Tool Suite—may be used in certain situations to build the System of Associates. The Integrated Knowledge Environment includes various key components of the Associate System and is a very efficient manner to acquire the information needed for the Concept Knowledge Base 63, Plan Goal-Graph Knowledge Base 64, Monitors and Notifications 65, Intermediate Representations 66, and Value-Added calculations 67.

Figure 6:
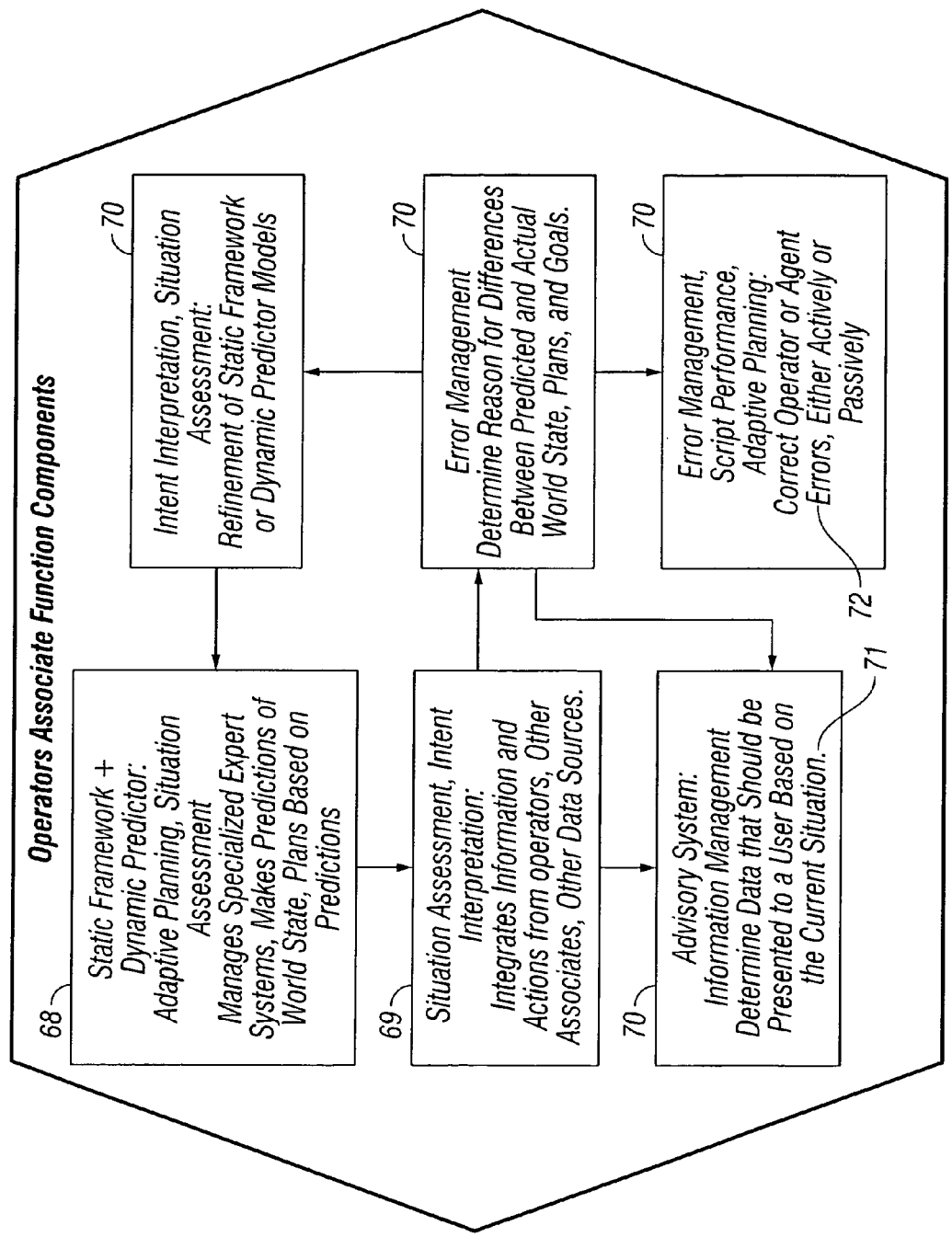
FIG. 6: Operators Associate Functional Components and Behavior

FIG. 6: Operators Associate Functional Components and Behavior are an integral part of the system of systems. Associate System Architecture creates an intelligence set of behaviors, which are human-like in their responses to the world. Several of the features enable the functional components to function properly. There are several principal features of the behaviors. The associate is an active collector of information 68, which is aware of the need for information and takes actions 69 to acquire and refine its awareness. The associates are goal-driven and persistently attempt to accomplish their purpose using a 70 variety of means. The associates reason at multiple levels about the external world and its own internal states based on knowledge at multiple levels of abstraction. The associate is context-sensitive communicator, which understands external inputs and shapes its communications 71 to the needs of the receiving party. The associates learn from experience 72 and adapt their knowledge of the world and of itself as a result of experience.

The associate system coordinates its behaviors at four distinct levels. At the lowest level, the intelligent aiding system must coordinate between its own assessment 69, planning 68 and acting processes 70 and 71 to produce coherent behaviors. Secondly, it coordinates at the planning level 68 with its operations management to receive direction and provide useful recommendations 70. It must also coordinate with the operations management at the action level so that the manager 70 and the associate 72 can act in concert. At the highest level, the intelligent aid must coordinate with the other independent participants 70 to avoid undesirable conflicts and to satisfy the requirements of higher authorities in the domain.

Figure 7:
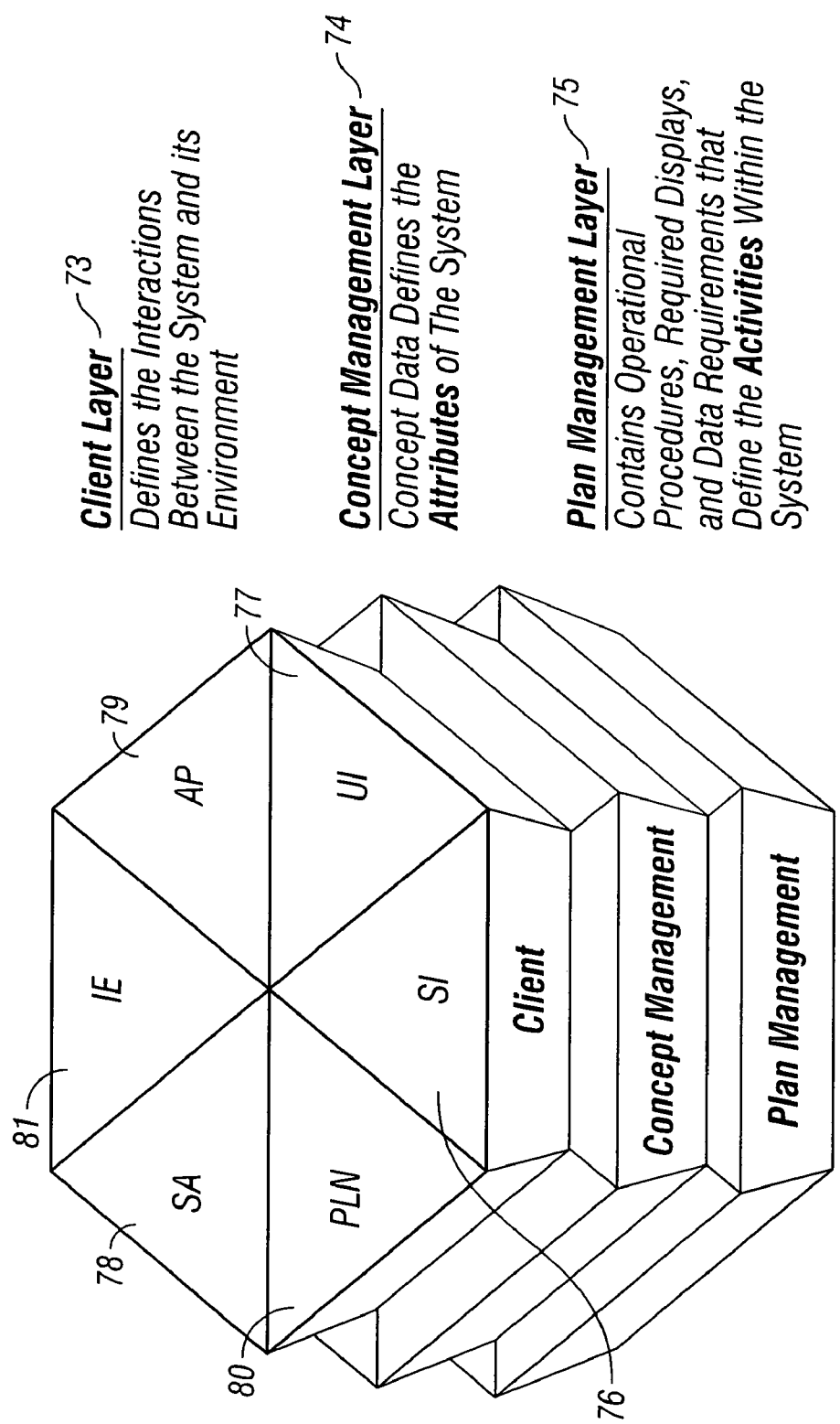
FIG. 7—Associate System Layered Architecture

FIG. 7—Associate System Layered Architecture function at the client layer 73, concept management layer 74, and the plan management layer 75.

The nodes in the client layer are intended to define the interactions 73 between the system and its environment. It accomplishes this through several components. A Systems Interface (SI) 76 acquires all available information and sends out associate actions. A User Interface (UI) 77 communicates information and notifications to the user. Situation Assessment (SA) 78 evaluates internal and external circumstances. Activity Performer (AP) 79 performs the activities on behalf of the operations manager if authorized. Plan Generation (PLN) 80 develops responses to the detected circumstances. Intent Estimation (IE) 81 attempts to explain operations manager intent in the context of the circumstances and proposed responses.

The client layer provides the associate behaviors to the system and is supported by two other layers, which continually maintain persistent information, which supports intelligent behavior. This persistent information consists of the perception layer describing the circumstances (Concept Management) 74 and the decision layer (Plan Management) 75 containing all of the feasible responses to the circumstances. Associate systems usually provide several of the following functional capabilities:

Situation Assessment (SA). 78 are a functional capability that supports the organization of large amounts of dynamic data into concepts at varying levels of aggregation and abstraction. It builds a model of the context in which the aiding system is operating and provides access to the contents of the model to other software processes and to the operations manager. Planning and Plan Understanding (PLN and IE). 80 and 81 is based on the situation as determined by Situation Assessment 78; plans are formulated by the aiding system 80. The plans 75 may be of many kinds and cover different periods of time at different levels of abstraction. The planning capability can independently formulate and propose plans to the operations manager, and can complete 80 the details of partial plans provided by the users. Activity Performer (AP) 79 enables applications that perform complex, state-dependant procedures and that can blend direct user inputs with automatic task execution. An intelligent aiding system is not necessarily a passive system, but may also have the capability to act on behalf of operations managers. Given a set of plans 75 and an evolving situation 74, the intelligent aiding system may perform actions directly, such as requesting specific information from a certain set of sources 77, or sending notifications 73 to other agencies of possible threats.

Figure 8:
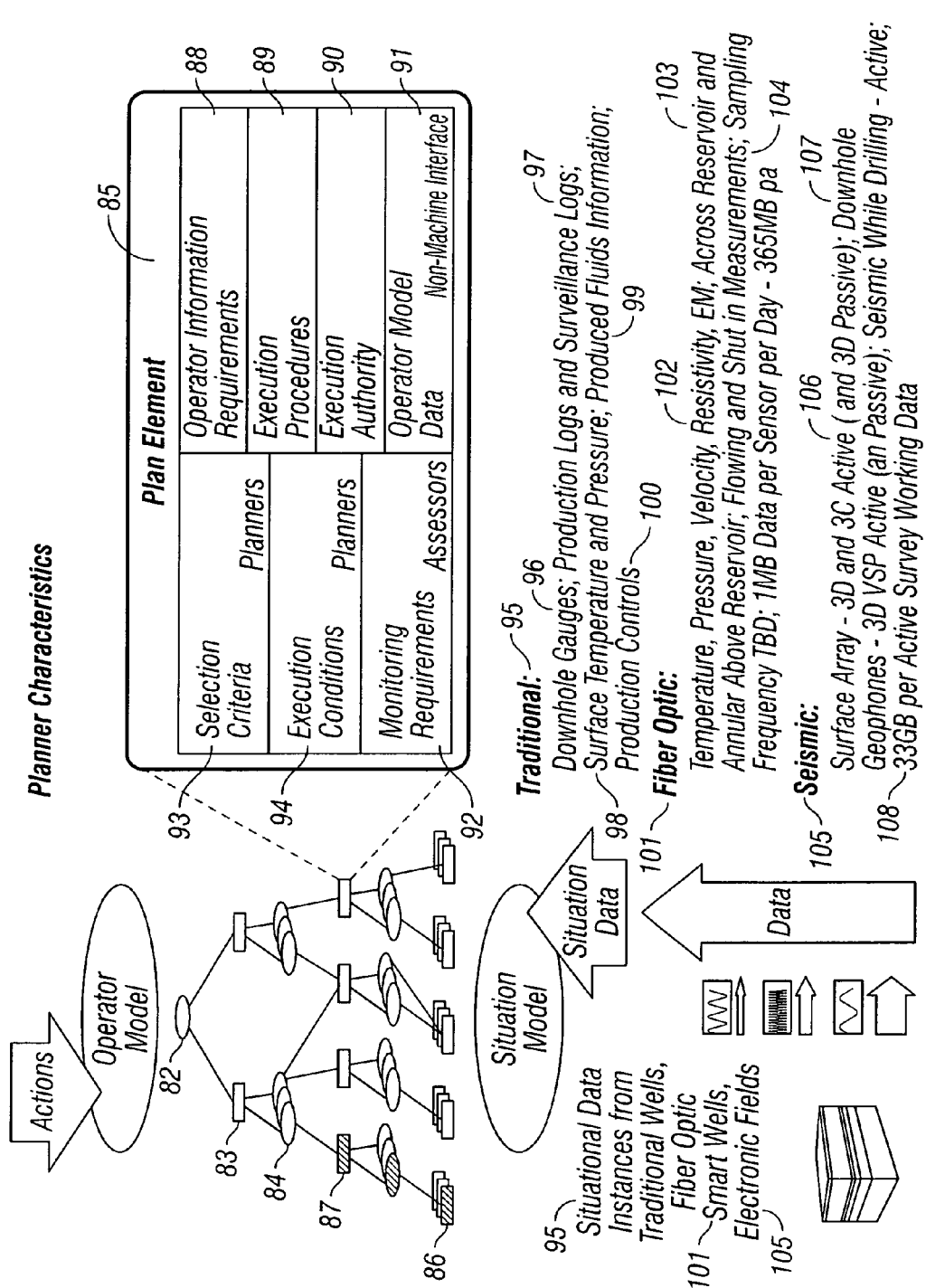
FIG. 8—Structure of a Plan-Goal Graph, Planner Characteristics, Situational Data Instances from Traditional Wells, Fiber Optic Smart Wells, Electronic Field FIG. 9—Activity Plan Life Cycle

FIG. 8—This figure illustrates the Structure of a Plan-Goal Graph, Planner Characteristics, and Situational Data Instances during the Drilling and building of the wells and during production from Traditional Wells, Fiber Optic Smart Wells, and Electronic Field.

The Plan-Goal Graph 82 uses abstraction and aggregation to represent the knowledge of the system. This fundamental knowledge that supports planning is the representation of an activity and its effects. Associates plan with abstract and aggregated activities and accept planning with only partial ordering The Plan-Goal Graph is a directed, acyclic graph of nodes 83 and links 84 that represents a hierarchy of goals and plans with a specific set of structural relationships. It is a representation that is typical for supporting a form of planning known as hierarchical task network planning. In the PGG representation, the notion of plan does not imply a specific sequence of primitive actions. Instead, a PGG plan node represents an abstract set of activity that may or may not have a specific sequence of action defined for it. A summary of the knowledge contained in a PGG is shown in the Plan Element 85.

The lowest level of the PGG consists of actions 86 that can be directly performed by an agent, either human or machine. The actions are linked to parent plan nodes 83, which imply the performance of the parent plan consists of performing all of its action children 83. A plan node 87 is in turn linked to a goal node 88 that represents the intended state to be achieved by executing the plan. A goal node may be a sub-goal of a larger activity, and hence would be linked to a parent plan representing the more abstract and aggregated behavior.

At the top level of the PGG are the abstract goals 83 of the system. Their children plans are highly aggregated and abstract behaviors. As the levels of the PGG are traversed downwards, each layer becomes more concrete and specific 87, until the lowest level actions 86 are reached.

The PGG captures a hierarchical view of the available operations and their effects 88, where the plan nodes represent operations and their parent goals represent the intended effects 93. The PGG also defines the allowable alternatives 94 for achieving a goal in the form of the set of children plans of that goal. The links between the nodes contain constraints 92 that determine plan node selection and function calls 94 that determine plan instantiation. Traversing down the PGG, creating instances of more concrete plan and goal nodes as the levels are traversed, performs plan generation.

In addition to abstraction and aggregation, a planner 88 must use knowledge about resource use 89 and contention for resources 90 between concurrent activities. In the PGG representation, each plan node contains information about what resources 91 it requires and its conditions of use. The resource use versus availability can be checked with constraints associated with the links from goal to plan. If a candidate plan node requires more resources than are expected to be available, the candidate plan node cannot be selected. Situational Data Sources provide data in different quantities and complexity to the situation model. The drilling, well building process, and well testing provide data from traditional sources. At the commencement of production from each well additional data is acquired and used in the BHA for drilling of the next well. Traditional Wells 95 provide data from down hole gauges 96, production logs 97, surface pressure and temperature 98, produced fluids information 99, and production controls 100. Fiber optic systems 101 called Smart wells provide data in different formats and larger volumes and include temperature, pressure, velocity, Resistivity, electro magnetic 102; data across reservoir and annular above reservoir 103; flowing and shut in measurements 104 in much larger amounts and more frequent samples. Electronic Fields 106 provide all of the data above and include surface arrays of 3D & 3C seismic data 108, Down hole geophones in 3 D and VSP active 107, and seismic while drilling 108 with all of the data in much larger volumes.

Figure 9:
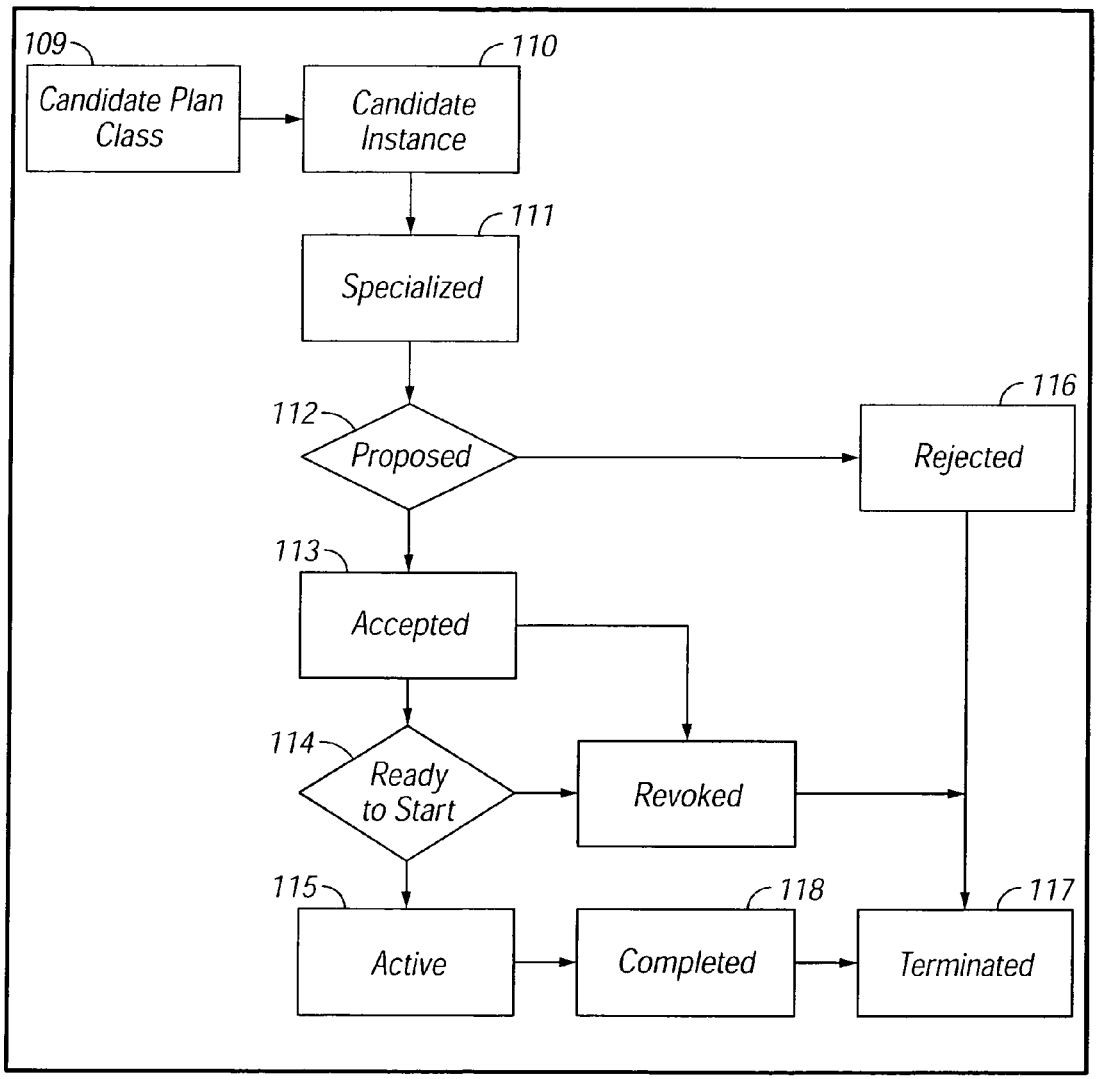

FIG. 9—Activity Plan Life Cycle Planning is best understood from the perspective of the life cycle of a planned set of activities, rather than simply from the perspective of plan generation. Without support for the other stages of plan use that precede and follow plan generation, the effectiveness of computer-based planning is greatly reduced. This is a direct result of the dynamic nature of the environment and the inability to predict its future state very far in advance. A typical life-cycle view is shown in the Figure. The life cycle begins when a new goal is posted to the planning system. The first step is to identify candidate plan classes 109 that could be considered as a possible response to a goal. Each candidate plan that is appropriate is then instantiated 110 by determining initial values for its instance defining attributes 111 and its updateable attributes. Specifying the attributes of a plan may require recursive decomposition of the plan into its sub-goals and sub-plans, or some other process for determining the attribute values. Once the attribute values are defined, the candidate plan can be evaluated to determine its comparative ranking with other candidate plans.

The planner then selects one or more of the candidate plans as proposals 112 to other agents who are responsible for performing the plan. This is especially the case in coordination with human operators. If the performing agent accepts the candidate plan 113, it enters a waiting state 114 until it is ready to start or the plan may be rejected 116 and then terminated 119. During this waiting state, the updateable attributes of the plan must be maintained by the planning system so that the plan remains relevant to the changing environmental conditions. When the plan satisfies its conditions for starting, the plan transitions to "active." 115 The activities that are a part of the plan then occur until the plan is completed 118 or terminated 119. The plan is maintained while it is active, so that changes in the world state are reflected in the attributes of the plan and the lower level activities needed to perform it.

During this life cycle, events may occur which cause the plan to be inappropriate or to fail. An important responsibility of the planning system is to continue to monitor plans for termination conditions that indicate the updateable attributes of a plan can no longer be successfully adapted to meet the changing conditions. When a plan fails, the planning system can request the plan be revoked 118. If the agent responsible for plan performance consents to the requested revocation, the failed plan instance can be terminated 119 and other candidates can be proposed instead.

The planning system is important in that it will make projections of what may likely occur in the future. The planner can make changes to the PGG nodes, which in turn updates the plans. The PGG then submits monitor change (post monitors) requests back to the DSA that sends (fires) monitors back data to the planner. The planner updates and sends requests back to the PGG. The planning system is important to meet the changing operational environment.

Figure 10:
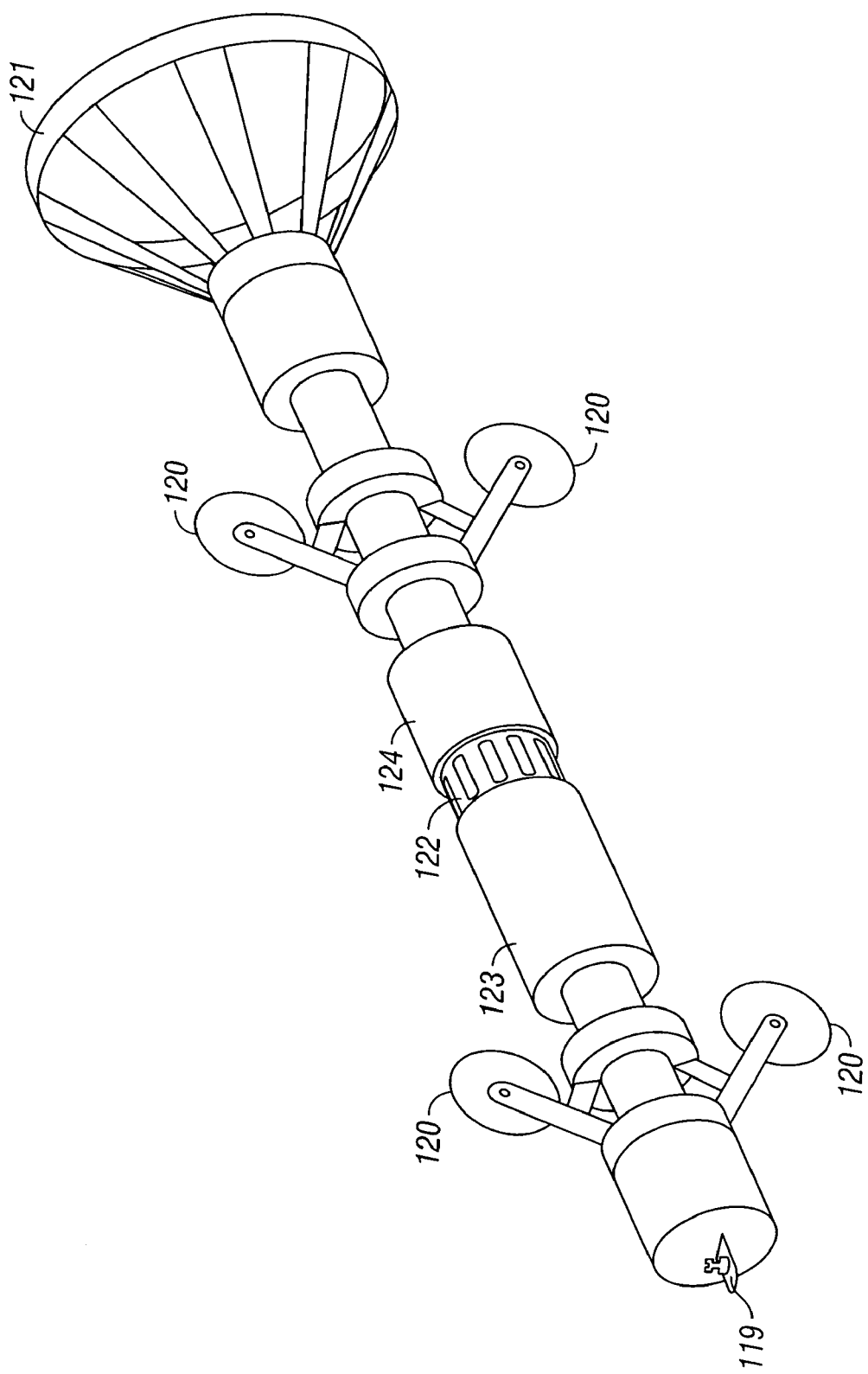
FIGS. 10, 10*a*, 10*b*, 10*c*, 10*d*, 10*e*: A schematic design of the Robotic Device shown in a well (round conduit) according to the present invention including an end work tool, mobility device, turbine and battery, expandable bellows, and parachute.
Figure 10A:
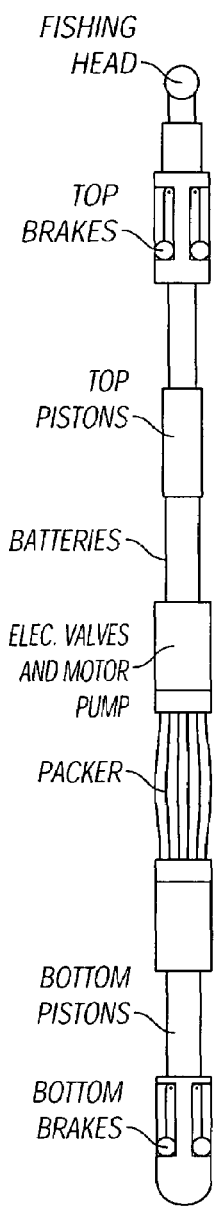

FIG. 10 Robot Sketch

Autonomous Robotic Maintenance Device is an invention that provides a system with a down hole tool 119, mobility platform 120/121, turbine 122, battery 123, and control module 124 that can direct the performance of a desired operation in the well bore or similar conduit.

The tools 119 used will be existing tools or new tools incorporated into the robotic device to perform logging work, collect samples, perforate, plug, move sleeves, imaging, cutting, and remove or replace parts or tools specifically built to carry out preventive maintenance operation that can be carried out during production such as patching areas in need of repairs, acquiring inspection related data, operating devices such as sleeves, chokes, valves, and sensors without shutting off production. The mobility platform consists of wheels 120 that can be extended to maintain contact with the surface of the well or conduit. The turbine will assist in the provision of power and recharging of auxiliary batteries 123. The extendable packer 121 will provide the means to capture energy from the existing flow of produced materials in the well or conduit. The control modules 124 will direct the mobility and work functions performed by the tool. The control module is an associate of a system comprised of numerous associates.

FIGS. 11-15; 10a-e: Robot Locomotion Using Inch Worm and Iris Drives

A technique is described that employs a robotic means (FIG. 11: schematic design-10a) of lowering servicing and measurement equipment into a well and removing that equipment from the well upon completion of services. This system has more than double the energy efficiency because it uses a different means of raising and lowering itself. In fact the present invention uses either or both of two types of locomotion.

Figure 10B:
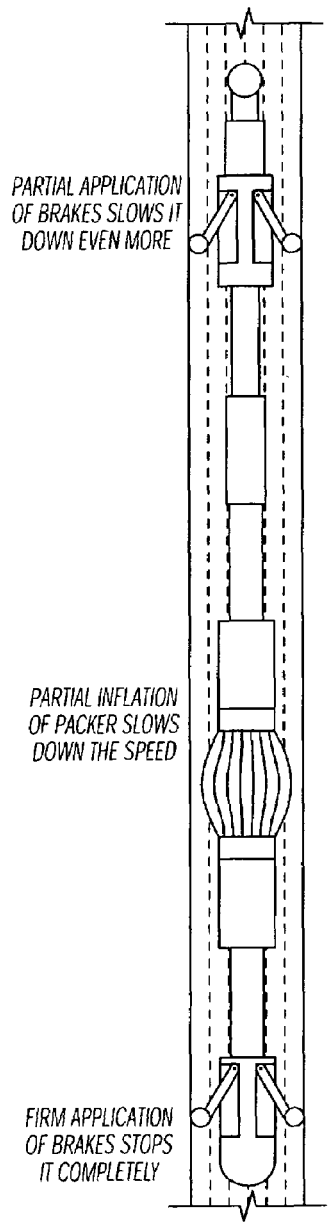

First is an "inch-worm" technique (FIG. 12-10b) wherein a brake is asserted against the casing (or tubing) wall using hydraulic or other power means. An arm is then extended up (or down), and brakes at the end of the arm are engaged against the casing wall. The lower (or higher, respectively) brake is then released and the arm is retracted to bring the unengaged clamps close to the engaged clamps. This motion is repeated resulting in progressive movement through the well bore.

The second means can be used in wells with liquid phase materials in the well bore. It uses an iris the diameter of which can be controlled by sensors on the robot. The iris extends normally extends beyond the outside diameter of the tool and its extent can be controlled by actuators disposed in the tool and operated by electric or other power sources. For downward motion FIG. 12-10b, the iris is extended to reduce the annulus between the outside diameter of the iris and the inside diameter of the casing (or tubing) to the point were the fluid friction keeps the robot from accelerating its downward speed. Thus, with well-conditioned control of the iris diameter, the robot can fall downward until it reaches a horizontal part of the hole, a mechanical obstruction in the well, or until it reaches a predetermined downhole location. In this mode, energy consumption is very small compared to a tractor or even "inch-worm" design, because only the friction in the iris extension mechanism needs to be overcome.

Figure 10C:
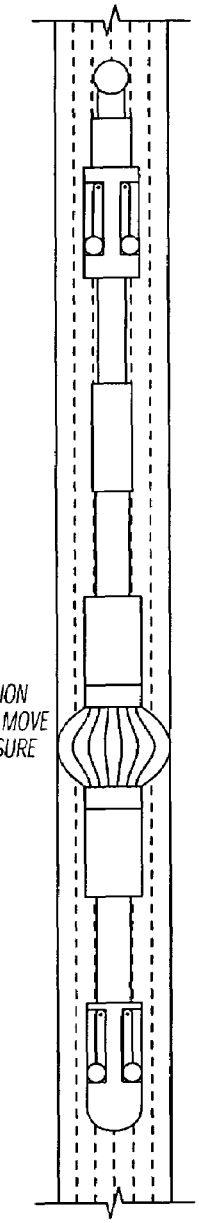

If there is upward flow of liquids in the well (FIG. 13-10c), the iris can be used to lift the robot out of the well after the mission is completed. Upward movement can use the same control system but with a smaller annulus between the iris outer diameter and the casing (tubing) inner diameter.

Combining the "inch-worm" drive with liquid conveyance will result in significant power savings. Downhole power, whether electric, hydraulic, or other, is ultimately supplied by batteries disposed in the tool. The largest cost on any downhole mission is the cost of the lithium batteries (which are currently the state-of-the-art in downhole batteries), hence, significant power savings translates directly to cost savings. Even if only the "inch worm" drive is used, it uses less energy than a chain drive because it has much lower friction losses such as the power going into the chain.

Capabilities of the Downhole Tool

A downhole tool has a capability for servicing wells that are drilled and completed at high angles and using multilateral branches to enhance oil and gas recovery. Such highly deviated wells are expensive to service. The robotic tool described above reduced the cost of servicing such wells because it does not require a rig stationed over the well during the servicing. In addition, in wells that are producing hydrocarbons, production can be continued (at some reduced rate) during passage of the robot through the well because the robot does not occupy the entire diameter of the well.

An important capability is to navigate along the correct branch of a multi-lateral completion. The tool design includes articulation so that part of the tool can move in a direction other than the principal path followed to get to a particular depth in the well. Then sensors in the tool are used to identify optional directions to be taken. Information preprogrammed into the computer control system of the tool use the data from the sensors to set the new direction for the tool to follow.

The tool further includes sensors to establish its current position in the well based on recognition of features of the well construction that are also described in a suitable form for the downhole computer. The computer then uses a pattern recognition routine in order to track its position based on a map of the well also loaded into the downhole computer memory.

Figure 10D:
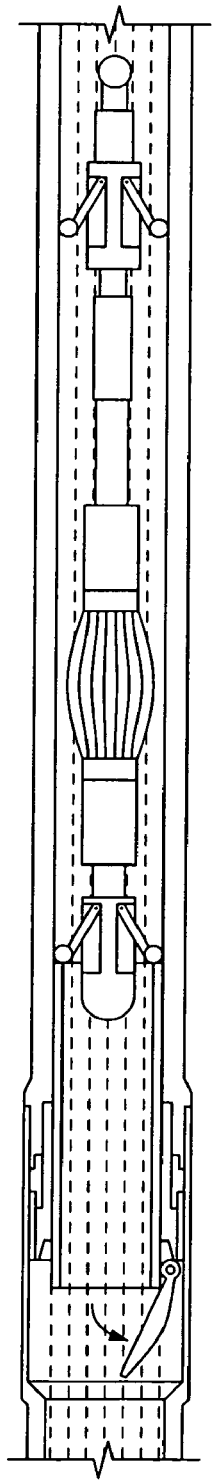
Figure 10E:
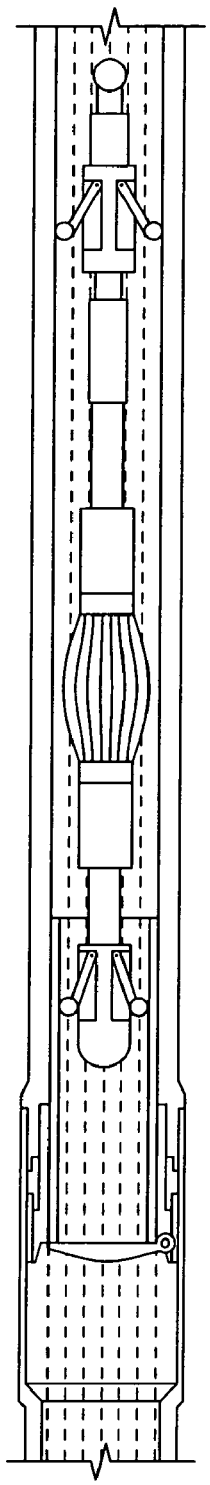

The tool also includes mechanical actuators FIG. 14-10d and other devices for performing operations on downhole hardware. Thus the tool can open and FIG. 15-10e close valves, set packers, set bridge plugs, and conduct other operations needed to enhance productivity of the well.

The tool can convey sensors to assess performance of the well and to measure properties of the formation behind the casing. Such sensors may include gamma ray, neutron sensors, electrical, acoustic, and other electromagnetic sensors as may be understood by those skilled in the art of well logging.

In some embodiments, the tool can be used to convey perforating guns and to cause those guns to be discharged at controlled locations in the well. By using the depth correlation software described above, the tool can convey a perforating gun to the correct location, and it can deploy mechanical devices to constrain the gun to remain stationary until a command is provided to fire the guns. This capability allows the robot to move away from the gun during the time the gun is fired, and thereby the robot is not damaged by the percussive forces generated by the firing of the gun. After firing the gun, the robot can return to retrieve the empty gun, or it can leave the gun in place as defined by the configuration of the gun.

Another capability of the tool is that it may be configured to permit either unidirectional or bidirectional communication with the surface by means of electronic, acoustic, or mechanical pulsing. This capability will make it possible for a person to review data collected by the tool in preparation for performing a mechanical service or for perforating. Often, a review of the collar or gamma ray log is highly desirable prior to firing a perforating gun, and a bi-directional communications system will enable such a check on the tool location.

Maintenance management takes place through the use of several associates each dealing with discrete elements taking place during the production of hydrocarbons. One of the resources used by an associate is a maintenance forecast which is considered an optimal solution at a period in time. The dynamic well environment creates the need for changes in the assumptions used for the optimization model. The associates continuously monitor data and determine when the change is significant enough that a new plan is appropriate, receives the results, and makes that data available as a key part of the global situational awareness.

Associates, with permission of operations management, automate many of the tasks that are routine for the manager, but leave to the manager the complex decision making and analysis. Some components used by Associates are implemented as rules. Associates provide the connectivity between wells and domain experts is required for a successful solution of increased production. A system of associates is able to share situational awareness and purpose among a team of people and provides the functionality necessary to integrate the activities in significant portions of the management of the reservoir.

Associates represent the knowledge that truly characterizes expert problem solving behavior in the form of a purpose graph. It is this explicit representation of purpose in the Plan-Goal Graph (PGG) that allows the development of very large and highly complex intelligent systems. To further strengthen the value of a purpose-driven knowledge representation, the systems has an inherent ability to share purpose and context with other systems to create a distributed, collaborative problem-solving network. In this manner, Associates overcome the problems inherent in when conventional rule-base systems attempt to deal with large, complex, and dynamic systems. The limitations include the difficulty of knowledge elicitation, the complexity of the rule structure and controlling execution threads, rule maintenance, and most importantly, the challenge of testing and validating systems with no clearly defined behavior. Associates use rules in certain situations such as: the correct selection of plans or goals appropriate to a situation, or the correct interpretation of an action in terms of plans and goals involve rules that form criteria and constraints within the Plan Goal Graph (PGG).

The PGG provides an organization of purpose to a rule base and adds the 'know why' structure to the 'know how' rules. The rules associates use tend to be small, local, easily validated rule sets distributed throughout the PGG structure rather than a single, monolithic inference engine applying one set of rules to the complete problem.

Associates use decision aiding to supply tools for assisting the humans in organizing data, structuring alternatives and evaluating options. Associates can be used to automate the decision process rather than aid the decision-maker this capability enables the Maintenance Assembly to function autonomously in a robotic manner. At the same time, safety is ensured because Associate systems maintain the operations manager in the role of the decision maker while providing safeguards against situations in which the time available or the complexity of the problem reduces the likelihood that the operations manager can find an acceptable solution. In these cases, an associate system can propose a candidate solution for the human, or in the extreme, propose, select and execute the solution for the human.

Associate Plan-Goal Graphs and Concept Graphs are used to define the core elements of the system. Various of these structures will be built representing conditions throughout the oil field.

Figure 11:
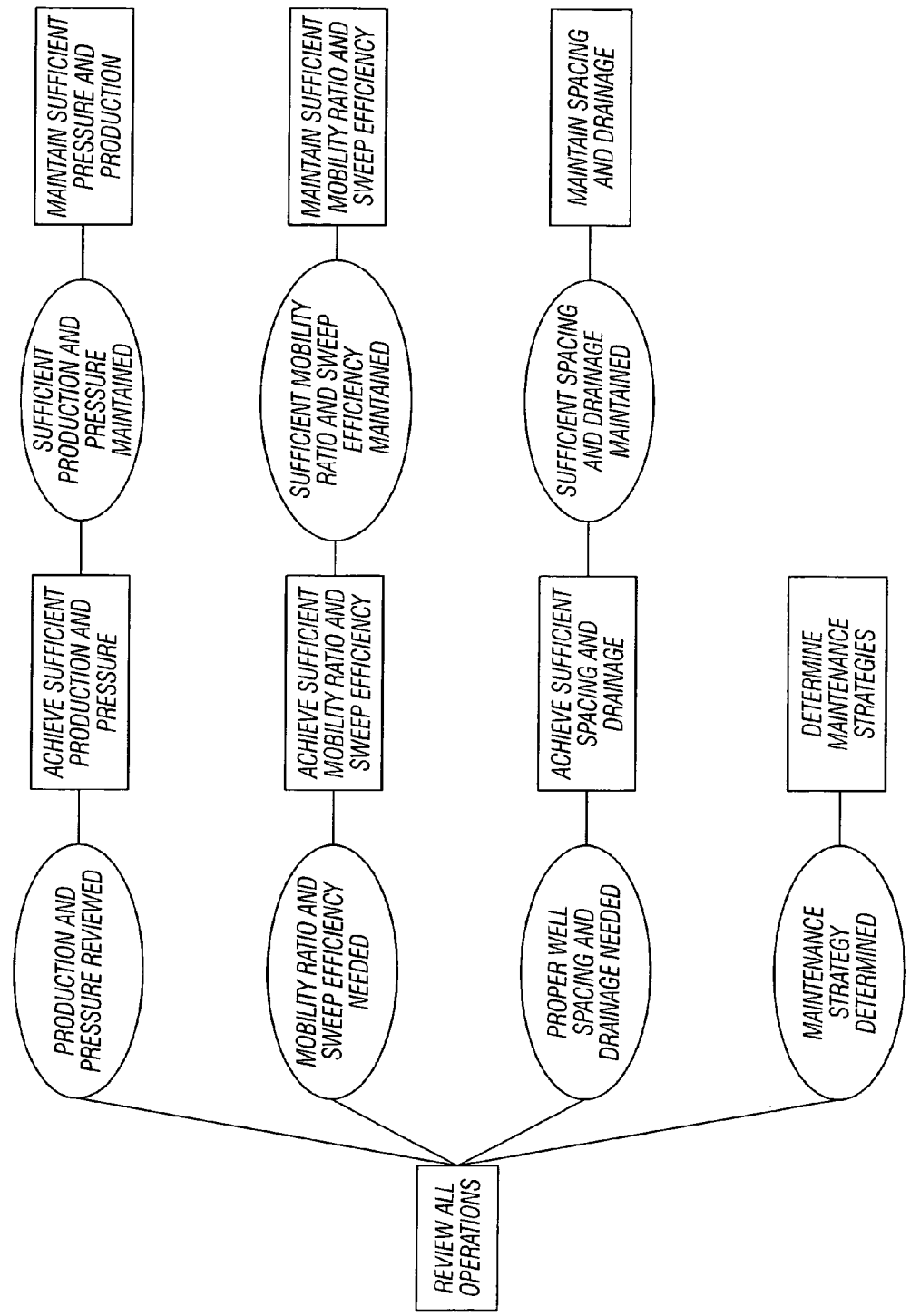
FIG. 11—Fragment of Well Maintenance Management—Review Maintenance Goal Graph.

FIG. 11 is an illustration of the Plan Goal Graphs: Fragment of Well Maintenance Management Plan—Maintenance management Goal Graph. Plan Goal Graphs use the same structure which is an acyclic, hierarchical description of intended activities. As such, it describes goals, plans, and actions. It is intended to decompose activities according to their purposes, and is not a classification hierarchy. The PGG is used to assist planning, intent interpretation, and information management. For Maintenance and Drilling, the PGG is used to break down the activities needed to accomplish the mission of an autonomously capable robotic bottom hole assembly which is able to drill faster, safer, and more accurately though the use of several associates updating relevant knowledge in a relevant time frame and alternative methods that could be used to do these activities. The PGG concept will be used for other activities such as for Reservoir Management, the PGG is used to break down the activities needed to accomplish the mission of improving oil production, along with the alternative methods that could be used to do these activities. These Plan Goal Graphs are built and will work with others to focus on managing specific areas Thus, the PGG will allow us to suggest possible alternative actions that could be taken by an operator (use volumetric versus material balance calculations and look at remaining reserves), given a specific plan (secondary recovery plan given environmental constraints), or conversely, allow us to interpret actions taken by an operator to determine the robotic maintenance assemblies and/or operator's intent. The interaction between these multiple associates will create emergent behaviors to improve the management of the maintenance process and the reservoir management process.

Figure 12:
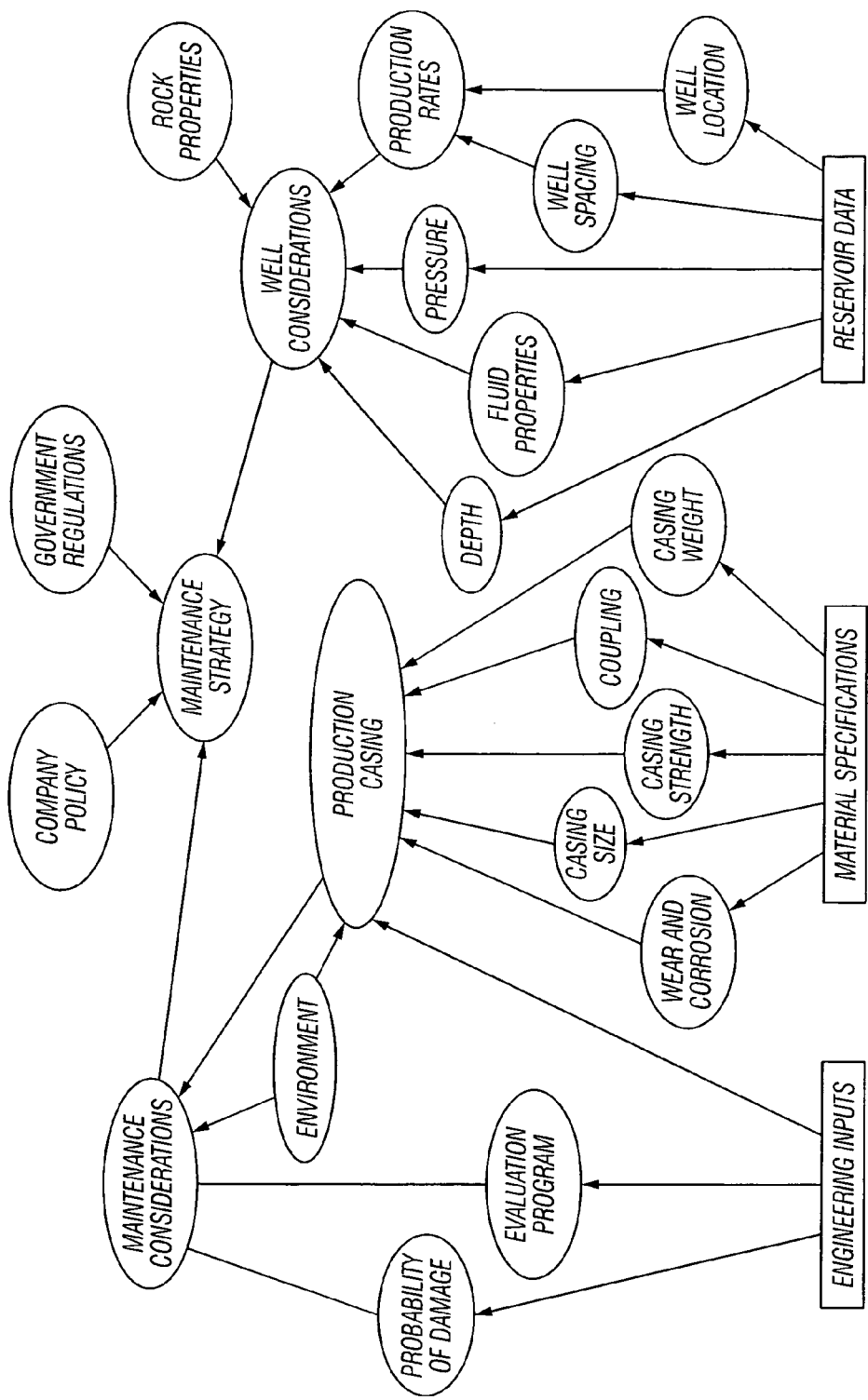
FIG. 12—Fragment of Concept Graph for Maintenance Management.

FIG. 12: Fragment of Concept Graph for Maintenance Management. The concept graph is the element of the system that represents the state of the world. Numerous Concept graphs will be required to work in conjunction with specified Plan Goal Graphs.

The drawings representing concept graphs describe their actions: Fragment of Concept Graph for Maintenance Management is represented in FIG. 12. Concept Graphs for Drilling, Logistics, Reservoir Management, and other activities can work collaboratively with each other. Concept graphs required for defining the state of the world in different areas needed for reservoir management. Each of the concept graphs (CNG) is an acyclic, hierarchical description of the factual (or believed) state of the world. It is designed to increase in abstraction and aggregation as one moves up in the graph, as well as show dependencies between concepts in the form of links.

The concept graphs will be carried by the robotic maintenance assembly and as distributed sub set of concept graphs at the surface. These concept graphs will enable the robotic maintenance assembly to function and determine the relevant data to be processed and sent to the plan goal graphs.

What is claimed as new and desired to be secured by Letters Patent of the United States is:

1. A robot for repairing and maintaining oil and gas wells, comprising:
   a. a control system which uses sensor data:
      i. to maintain force against an inside wall of a tubing to prevent slippage;
      ii. to control advancing of the robot against obstacles in its path;
      iii. to detect leaks in the robot's hydraulics; and
      iv. to allow the robot to perform tasks,
   b. a motion sensor connected to the control system;
   c. means for using well liquids for self-propulsion, and
   d. an inch-worm drive for self propulsion, wherein:
      i. the inch-worm drive has a first arm having a first clamp, and a second arm having a second clamp, and the inch-worm drive moves by extending the first arm and clamping the first clamp against the inside wall of the tubing, then extending the second arm forward from the first arm, and clamping the second clamp against the wall, then releasing the first clamp, and moving the first arm to clamp the wall with the first clamp, close to the second clamp;
      ii. the clamps are hydraulically actuated to allow a control arm force, control slippage, and dithering the force element on the wall to control free fall of the tool into the well to save battery power;
      iii. the clamps also serve as centralizing mechanisms to permit better control of the robot's direction, and
      iv. the means for using well liquids comprises an iris having a controllable circumference.

2. The robot of claim 1, wherein the means for using well liquids comprises an inflatable member whose diameter is controlled using hydraulic actuation.

3. The robot of claim 1, wherein:
   a. in free fall the iris extends to leave a small gap between the circumference of the iris and the inside wall;
   b. the motion sensor feeds motion data to the control system;
   c. in response to the motion data, the control system extends and retracts the iris to maintain speed;
   d. the control system recognizes any deviation in the inside wall, and turns over self-propulsion control to the inch-worm in highly deviated wells and in horizontal wells; and
   e. in free lift the iris further extends to use the production flow to lift the tool.

* * * * *